United States Patent Office 3,630,889
Patented Dec. 28, 1971

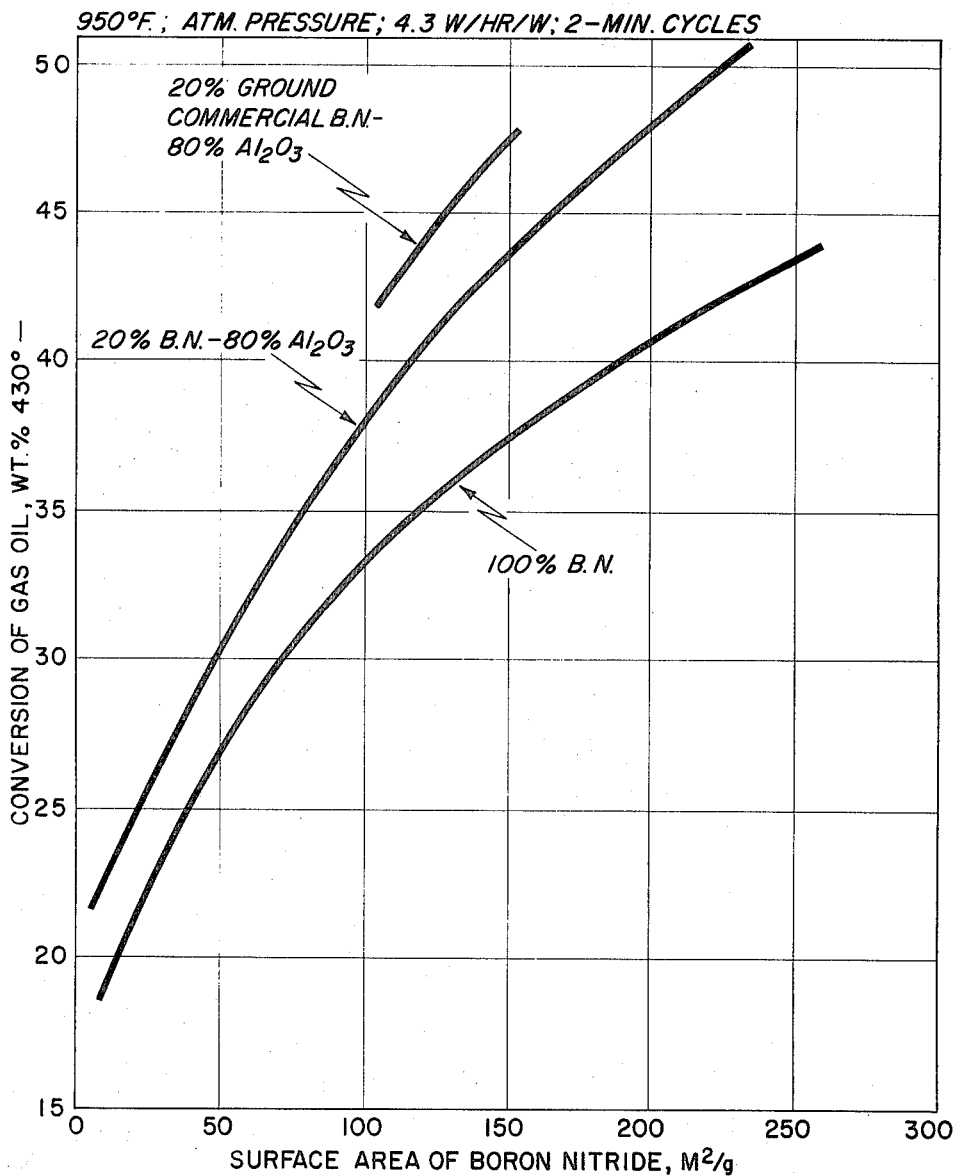

3,630,889
METAL NITRIDES AS CRACKING CATALYSTS
William F. Arey, Jr., and William J. Mattox, Baton Rouge, La., assignors to Esso Research and Engineering Company
Filed Jan. 21, 1969, Ser. No. 792,653
Int. Cl. C10g 11/02; B01j 11/82
U.S. Cl. 208—114                                          15 Claims

ABSTRACT OF THE DISCLOSURE

A cracking catalyst consists essentially of a nitride of aluminum, boron, or silicon, supported or not, on alumina or alumina/silica, titania, zirconia and the like.

BACKGROUND OF THE INVENTION

This application relates to a process for catalytically cracking hydrocarbon feedstocks and a catalytic composition for such a process.

The cracking of hydrocarbons feedstocks has become of major commercial significance during recent decades. Most commercial units use a silica-alumina containing 25% $Al_2O_3$ which gives excellent yields of gasoline.

SUMMARY OF THE INVENTION

It has now been discovered that excellent gasoline yields and selectivity to $C_5$ to 430° F. can be obtained by contacting a hydrocarbon feedstock under cracking conditions with a nitride of aluminum, boron or silicon either alone or composited with $Al_2O_3$ or with $SiO_2$—$Al_2O_3$. Other supports such as titania and zirconia may also be used.

SPECIFIC EMBODIMENTS

Aluminum nitride can be obtained by heating a mixture of aluminum, carbon and calcium fluoride or sodium aluminum fluoride to 1000° C. in an atmosphere of nitrogen until the mixture contains 60–85% AlN. The resulting refractory melts at 2200° C.

Silicon nitride ($S_3N_4$) can be prepared by heating silicon in nitrogen at 1450° C. The nitride is formed in ten minutes when using finely divided silicon obtained by cooling a 10% solution in aluminum while crystalline silicon requires several hours. The compound is a greyish-white amorphous powder having a specific gravity of 3.44. It sublimes at atmospheric pressure and melts at 1900° C. under pressure.

Boron nitride is a white talc-like substance of low bulk density of about 0.1 gram per ml. having an X-ray pattern similar to that of graphite. It is very refractory, being stable in either reducing or oxidizing atmospheres at temperatures up to and above 1000° C. It has a melting point of about 5400° F. and is hydrolyzed very slowly with steam at elevated temperatures. The catalytic properties of the high surface area boron nitrides are unique in that as single, pure compounds they have activities and produce cracking patterns similar to the highly developed commercial silica-alumina catalysts. It is easily prepared by reacting $NH_3$ with supported boron compounds.

The activity of the metal nitrides can be enhanced by mixing them with alumina or with silica-alumina composites such as the commercial catalysts.

The alumina when used with the nitrides may be prepared by a variety of methods. For example, it may be prepared by hydrolyzing an aluminum alcoholate which may have been prepared in accordance with the disclosures of U.S. Pat. No. 2,636,865. It may also be prepared by precipitating a hydrous alumina from an aqueous solution of an aluminum salt, preferably $AlCl_3$. A third method of preparation comprises dissolving metallic aluminum in weakly acidified water, preferably acidified with an organic acid, such as acetic acid, in the presence of mercury or a compound thereof, and thereafter gelling the alumina sol thus formed. The hydrous alumina prepared by any of the foregoing procedures is blended with the nitride to a uniform composition and the mixture is subsequently dried and calcined at temperatures between 600 and 1200° F., preferably between 900 and 1000° F. and in any event below the temperature at which various species of anhydrous alumina are converted to corundum (alpha-alumina).

The silica when used with the boron nitride may also be prepared by a variety of method. For example, a silica hydrol may be prepared by mixing a sodium silicate solution with a dilute acid, allowing the hydrosol to gel, breaking up the resulting mass of hydrogel, and washing the gel free of sloluble salts.

Substantially pure silica hydrosols may also be made by mixing sodium silicate or other alkali metal silicates with an excess of acid such as sulfurous acid or other acids to form a silica hydrosol containing an excess of acid as well as sodium sulfite and/or bisulfite when sulfurous acid is used. The entire acid treated mixture containing the silica hydrosol is then contacted with or percolated through an acid-regenerated cation exchange resin or other exchange material in order to effect essentially complete removal of the sodium or other alkali metal ion.

A number of techniques for preparing silica-alumina composities are known, among which are the following general methods: (1) precipitation in sequence, in which alumina is precipitated from an aluminum salt solution in the presence of a slurry of hydrous silica gel, (2) mixing of the two wet gels in appropriate proportions, and (3) impregnation of partially dried silica gel with an aluminum salt and subsequent thermal decomposition to form alumina. The precipitated or treated gels are washed and dried either before or after combination with the nitride.

In making a catalytic composition comprising the metal nitride and alumina or silica-alumina, the metal nitride may be added to the dried support before the support is calcined. Alternatively it may be added to a previously calcined support. In either case the nitride is physically mixed with the ground support and subsequently shaped and calcined.

Another method for adding the metal nitride to the support comprises adding the nitride to a liquid solution or sol when the support is made by precipitation from an aluminum salt solution or by gelling an alumina sol. Sufficient nitride is added to comprise from about 1 to 20 weight percent of the finished catalyst.

The surface area of any of the above catalysts may be increased by grinding as described in detail hereinafter.

Because of its refractory properties the inclusion of metal nitride in a catalytic composition does not increase the susceptability of the composition to temperature or poisons. However when dealing with boron nitride it is desirable to minimize the contact of the boron nitride compositions with water vapor at temperatures of about 1000° F. or above because of the tendency of boron nitride to hydrolyze to ammonia and boric acid.

The cracking of petroleum feedstocks such as virgin gas oil or the like may be carried out in a plurality of serially connected fixed bed reactors or in a fluidized bed. Suitable cracking conditions include temperatures in the range of about 700 to 1200° F., preferably between 800 and 1000° F. Suitable pressures lie between about atmospheric and 100 p.s.i.g., preferably between 10 and 50 p.s.i.g. Feed velocities may range between 0.1 and 10 weights of feed per weight of catalyst per hour (w./w./hr.), preferably between 0.5 and 5 w./w./hr.

To show the effectiveness of the invention, petroleum feedstock was cracked in a standardized laboratory apparatus at a temperature of 950° F., atmospheric pressure, and a feed rate of 4.3 w./hr./w. for two minutes using the following catalysts:

(1) A commercial boron nitride powder having a surface area of 11 M² per gram which was pelleted, crushed and screened and the 40-100 mesh material used as the catalyst.

(2) A boron nitride having a surface area of 77 M² per gram prepared by reacting boron anhydride with ammonia at 1650° F. The nitride was prepared by mixing 350 grams of boric acid, 200 grams tricalcium phosphate, and 244 ml. water to form a paste which was dried at 250° F. to a firm porous mass. The oven-dried material was crushed, screened and the 20-50 mesh portion was heated in a Vycor tube in a stream of ammonia at 1650° F. for 9 hours. The calcium phosphate was then extracted from the insoluble boron nitride with three portions of dilute HCl (1 liter of concentrated HCl/4 liters of water/ 100 grams of BN-tricalcium phosphate). The BN was washed free of chloride ions and dried.

(2a) A boron nitride catalyst having a surface area of 116 M² per gram, prepared in the same manner as catalyst No. 2.

(3) A boron nitride catalyst having a surface area of 123 M² per gram, prepared in same manner as catalyst No. 2.

(4) A boron nitride catalyst having a surface area of 220 M² per gram, prepared in the same manner as catalyst No. 2.

(5) A boron nitride catalyst having a surface area of 230 M² per gram, prepared in the same manner as catalyst No. 2.

(6) A commercial 3A silica-alumina catalyst containing 25% $Al_2O_3$ steamed at 1400° F. for 16 hours.

(7) Boron nitride catalysts Nos. 1, 2a, 3, and 4 were incorporated in alumina matrices in 20/80 weight ratio by slowly adding 73 grams of partially dried alcoholate alumina (68.5% $Al_2O_3$) under vigorous agitation to 350 ml. of water. Stirring was continued for an additional 5-10 minutes until the resulting gel was fluid and uniform. 12.5 grams of the finely divided BN was then added slowly to the stirred alumina gel. Stirring was then continued for another 15 minutes. The nitride-gel mixture was dried overnight in an evaporating dish at 250° F. The dried material was crushed, screened and the 40-100 mesh portion was calcined at 1000° F.

(7a) The composite formed from catalyst No. 1 had a surface area of 261 M² per gram.

(7b) The composite from catalyst No. 3 had a surface area of 345 M² per gram.

(7c) The composite from catalyst No. 4 had a surface area of 346 M² per gram.

(7d) The composite from catalyst No. 2a had a surface area of 290 M² per gram.

(8) A 20% BN-80% $SiO_2$ composite prepared by blending Ludox (119 grams; 42% $SiO_2$ and 58% $H_2O$) with 12.5 grams of BN catalyst No. 3 under vigorous agitation with slow addition of the BN. Isopropyl alcohol (200 ml.) was added to precipitate the $SiO_2$. Stirring was continued for 10 minutes to produce a homogeneous blend. Excess water was removed under an infrared lamp followed by oven drying at 250° F. The dried material was crushed, screened and the 60-100 mesh portion was calcined at 1000° F. The resulting composite had a surface area of 167 M² per gram.

(9) A 20% BN-80% ($SiO_2$-$Al_2O_3$) composite was prepared by mixing 250 grams (10% solids) of washed $SiO_2$-$Al_2O_3$ gel containing 13% $Al_2O_3$ with 70 ml. water and stirring vigorously to a smooth-flowing, pasty consistency. To this was then slowly added 6.3 grams of the boron nitride catalyst No. 3. Stirring was continued for fifteen minutes and the thick but fluid mixture was then patrially dried under an infrared lamp to a soft lumpy mass. The resulting material was further dried overnight in an oven at 250° F. The composite was crushed, screened and the 60-100 mesh portion calcined in nitrogen at 1000° F. The resulting composite had a surface area of 301 M² per gram.

(10) The low surface area BN catalyst No. 1 had its surface area increased by wet grinding in a Sweco vibratory mill using 30 grams of BN per liter of water. The aqueous suspension, recovered after decanting a portion of the supernatant water, contained 4.6 wt. percent BN. A portion of the ground nitride, recovered by evaporation of the aqueous phase and calcining with air at 1000° F., had a surface area of 126 M² per gram.

(11) A separate portion of the ground nitride suspension (272 grams) of catalyst No. 10 was diluted with water to a total volume of 350 ml. Alcoholate alumina (73 grams; 68.5% $Al_2O_3$) was slowly added with vigorous stirring until the resulting gel was fluid and uniform. The nitride-gel mixture was dried in an oven at 250° F. and then calcined in air at 1000° F. The resulting calcined 20% BN-80% $Al_2O_3$ composite was ground and screened and the 40-100 mesh portion found to have a surface area of 273 M² per gram.

(12) A 20% $Si_3N_4$-80% $Al_2O_3$ composite prepared with a commercial finely divided, low surface area silicon nitride and alcoholate alumina in same manner as catalyst No. 7.

(13) A 20% $Si_3N_4$-80% $Al_2O_3$ composite prepared with commercial silicon nitride ground to a surface area of 38 M² per gram and alcoholate alumina in same manner as catalyst No. 7.

(14) A 20% AlN-80% $Al_2O_3$ composite prepared with a commercial, finely divided, low surface area aluminum nitride and alcoholate alumina in same manner as catalyst No. 7.

EXAMPLE 1

Table I summarizes the results of various runs and highlights the advantages of using boron nitride as a catalyst to promote the cracking of East Texas Light Gas Oil under the condition set forth above.

TABLE I

| Catalyst Number | 1 | 2 | 5 | 6 |
|---|---|---|---|---|
| Surface area, M²/g | 11 | 77 | 230 | 1 |
| Conv., wt. percent 430- | 19.3 | 30.7 | 42.2 | 42.4 |
| Product dist., wt. percent: | | | | |
| Carbon | 2.9 | 0.2 | 14.5 | 1.7 |
| $C_3$-gas | 3.1 | 3.5 | 5.6 | 7.0 |
| $C_1$ cut | 3.7 | 3.4 | 5.4 | 8.3 |
| $C_5$-430 | 9.6 | 23.6 | 26.7 | 25.4 |
| 430-650 | 54.9 | 51.1 | 48.2 | 39.7 |
| 650+ | 25.8 | 18.1 | 9.6 | 17.9 |
| Selectivity to $C_5$-430, percent | 50 | 77 | 63 | 60 |
| i/n $C_4H_{10}$ | 9.2 | ∞ | 4.5 | 6.5 |
| $C_4H_8/C_4H_{10}$ | 1.7 | 2.5 | 1.9 | 1.4 |
| $C_2H_4$, CF/B | 29 | 32 | 42 | 24 |
| $C_3H_6$, CF/B | 22 | 28 | 47 | 122 |
| $C_4H_8$, wt. percent | 2.3 | 2.4 | 3.5 | 4.9 |

¹ Values probably high due to $N_2$ flush than steam stripping of used catalyst.

A comparison of the product distribution and selectivity data obtained at the same conversion level with the commercial $SiO_2$-$Al_2O_3$ (Catalyst No. 6) and with the high surface area boron nitride (Catalyst No. 5) shows that catalyst No. 5 gave a gasoline yield and selectively as good as or somewhat better than that from the 3A catalyst. Light olefin yields were variable; ethylene was higher and propylene lower with catalyst No. 5. The relationship of boron nitride cracking activity to surface area of the nitride is shown graphically in the figure.

EXAMPLE 2

Table II shows the beneficial effects of incorporating the boron nitride in an alumina matrix using the feed and conditions of Example 1.

TABLE II

| Catalyst Number | 7A | 7B | 7C |
|---|---|---|---|
| Catalyst surface area, M²/g.: | | | |
| BN component | 11 | 123 | 220 |
| BN-Al₂O₃ composite | 261 | 345 | 346 |
| Conversion, wt. percent 430°- | 23.1 | 40.9 | 49.4 |
| Product distribution, wt. percent: | | | |
| Carbon | 3.8 | 4.3 | 3.5 |
| C₃-gas | 7.7 | 7.0 | 8.8 |
| C₄ cut | 3.3 | 4.4 | 7.2 |
| C₅-430° | 8.3 | 25.2 | 29.9 |
| 430-650° | 55.4 | 48.5 | 39.8 |
| 650°+ | 21.5 | 10.6 | 10.8 |
| Selectivity to C₅-430°, wt. percent | 36 | 62 | 61 |
| i/n C₄H₁₀ | 2.6 | 2.2 | 4.2 |
| C₄H₈/C₄H₁₀ | 3.5 | 4.0 | 4.6 |
| C₂H₄, CF/B | 46 | 46 | 58 |
| C₃H₆, CF/B | 64 | 57 | 95 |
| C₄H₈, wt. percent | 2.5 | 3.5 | 5.9 |

The above tests show that when the BN is dispersed in an alumina matrix a much more favorable utilization of the nitride is obtained since a mixture of 20% BN–80% Al₂O₃ is more effective than 100% BN. The results obtained with the low-surface catalyst 7A show that the Al₂O₃ does not contribute significantly to the cracking activity, the 23% 430°-conversion being only 4% higher than that obtained with the nitride alone.

EXAMPLE 3

Table III summarizes the effects obtained when the BN is incorporated in SiO₂ and SiO₂—Al₂O₃ matrices using the feed and conditions of Example 1.

TABLE III

| Catalyst | 8 | 9 |
|---|---|---|
| Matrix component (80%) | SiO₂ | SiO₂-Al₂O₃(13%) |
| Surface area, M²/g.: | | |
| BN component (20%) | 123 | |
| Composite | 167 | 301 |
| Conversion, wt. percent 430°- | 29.7 | 69.5 |
| Product distribution, wt. percent: | | |
| Carbon | 12.4 | 6.1 |
| C₃-gas | 5.3 | 14.6 |
| C₄ Cut | 2.1 | 17.9 |
| C₅-430° | 9.9 | 30.9 |
| 430-650° | 46.5 | 25.4 |
| 650°+ | 23.8 | 5.1 |
| Selectivity to C₅-430°, wt. percent | 33 | 44 |
| i/n C₄H₁₀ | 3.7 | 7.8 |
| C₄H₈/C₄H₁₀ | 4.2 | 0.7 |
| C₂H₄, CF/B | 52 | 54 |
| C₃H₆, CF/B | 36 | 229 |
| C₄H₈, wt. percent | 1.6 | 7.6 |

The above data show that the SiO₂-matrix catalyst No. 8 was not as active and gave lower gasoline selectivity than the corresponding Al₂O₃ base or the SiO₂—Al₂O₃ base preparations, the latter giving a nitride-containing composite of very high activity that resulted in good gasoline yield.

EXAMPLE 4

The effect of grinding a low surface area, inactive catalyst is shown in Table IV using the feed and conditions of Example 1.

TABLE IV

| | Catalyst Number | | |
|---|---|---|---|
| | 7A | 11 | 7B |
| BN source | Unground commercial | Ground commercial | Unground laboratory |
| Surface area, M²/g.: | | | |
| BN component (20%) | 11 | 126 | 123 |
| Composite with Al₂O₃ | 261 | 273 | 345 |
| Conversion, wt. percent 430°- | 23.1 | 44.5 | 40.9 |
| Product distribution, wt. percent: | | | |
| Carbon | 3.8 | 4.0 | 4.3 |
| C₃-gas | 7.7 | 8.5 | 7.0 |
| C₄ cut | 3.3 | 4.9 | 4.4 |
| C₅-430° | 8.3 | 27.1 | 25.2 |
| 430°-650° | 55.4 | 43.2 | 48.5 |
| 650°+ | 21.5 | 12.3 | 10.6 |
| Selectivity to C₅-430°, wt. percent | 36 | 61 | 62 |

The above data illustrate the effectiveness of grinding as a means of producing high surface area, catalytically active BN catalysts. Grinding a commercial boron nitride increased its surface area from 11 to 126 M²/gram. An increase in conversion from 23.1 to 44.5% was obtained when the ground BN was used as a catalyst in the form of a composite with 80% Al₂O₃ (catalyst 7A vs. catalyst 11). This represents an increase in activity to a level somewhat above that of the composite catalyst prepared with laboratory synthesized BN of about the same surface area (catalyst No. 7B). Both of the nitride-alumina composites prepared with high surface BN (catalysts No. 3 and 10) gave high selectivities to gasolines of 61 and 62% as compared to 36% for the unground nitride.

EXAMPLE 5

Table V summarizes the results of cracking tests made with silicon nitride-alumina and with aluminum nitride-alumina composites, using the feed and conditions of Example 1.

TABLE V

| Catalyst | 20% Si₃N₄-80% Al₂O₃ | | 20% AlN-80% A.₂O₃ |
|---|---|---|---|
| Number | 12 | 13 | 14 |
| Surface area of nitride, M²/g | 2 | 38 | 1 |
| Conversion, wt. percent 430°- | 27.2 | 33.2 | 31.1 |
| Product distribution, wt percent: | | | |
| Carbon | 1.8 | 7.4 | 2.2 |
| C₃-gas | 5.5 | 6.0 | 6.7 |
| C₄ cut | 2.5 | 2.8 | 2.7 |
| C₅-430° | 17.4 | 17.0 | 19.5 |
| 430-650° | 50.6 | 51.1 | 50.5 |
| 650°+ | 22.2 | 15.7 | 18.4 |

Each of these nitride catalysts had substantial cracking activity although the surface areas of the nitrides were low. With the Si₃N₄-containing catalysts, an increase in surface area, as demonstrated by catalyst No. 13 as compared to No. 12, again resulted in significant improvement in catalyst activity.

EXAMPLE 6

The effectiveness of the nitride catalysts for converting heavy gas oil feedstocks is illustrated by the cracking data summarized in Table VI. These data were obtained with BN—Al₂O₃ and Si₃N₄—Al₂O₃ catalysts and a 650–850° F. gas oil, using the same conditions used in the previous examples with 15-minute cracking cycles.

TABLE VI

| | Feed | 20% BN-80% Al₂O₃ | 20% Si₃N₄-80% Al₂O₃ | 3A(25% Al₂O₃) |
|---|---|---|---|---|
| Catalyst number | | 7D | 13 | 6 |
| Conversion, wt. percent: | | | | |
| 430°- | | 48.0 | 40.4 | 44.9 |
| 650°- | | 62.8 | 58.5 | 54.8 |
| Product dist., wt. percent: | | | | |
| C₃- gas | | 7.2 | 5.5 | 8.2 |
| C₄ cut | | 3.5 | 1.7 | 4.7 |
| C₅-430 | | 31.2 | 27.3 | 28.0 |
| 430-650 | 7.0 | 21.8 | 25.1 | 16.9 |
| 650+ | 93.0 | 30.2 | 34.5 | 38.2 |
| Coke | | 6.1 | 5.9 | 4.0 |
| Selectivity to: | | | | |
| C₅-430° gasoline | | 65 | 68 | 62 |
| 430-650° mid-dist | | 24 | 31 | 18 |

The above data show that both the BN-containing and the Si₃N₄-containing catalysts effectively convert heavy gas oil to more valuable lower-boiling fractions. Comparative data are tabulated for steamed commercial 3A catalyst support. At the same process conditions the nitride catalysts converted 40–48% of the oil to 430°-products with selectivities to C₅-430° gasoline of 65–68%. These selectivities represent an improvement of 5–10% over 3A catalyst yields. The C₅-430° product from BN—Al₂O₃ cracking had a leaded (3 cc.) research octane of 93.7 and a leaded (3 cc.) motor octane of 80.2.

Conversion to 650°-products amounted to 59–63% with selectivities to 430–650° middle distillate of 24–31%. These greatly improved selectivities to middle distillate amount to 33–72% as compared to the yields of the same boiling range oil from standard 3A catalyst.

EXAMPLE 7

The desirable cracking characteristics of nitride-containing ctaalysts for the conversion of shale oil is illustrated by the data summarized in Table VII, using the same conditions as in the previous example and employing the 20% BN–80% Al$_2$O$_3$ catalyst 7D (supra) with a feed consisting of an 85% overhead fraction from the distillation of a crude, Rifle, Colorado, shale oil that had a nitrogen content of 2.8 wt. percent.

TABLE VII

|  | Feed | Product |
|---|---|---|
| Conversion, wt. percent: | | |
| 430°+ to 430°− | | 51.1 |
| 650°+ to 650°− | | 71.0 |
| Product distribution, wt. percent: | | |
| C$_3$- gas | | 9.0 |
| C$_4$ cut | | 2.6 |
| C$_5$–430° | 12.1 | 29.3 |
| 430–650° | 44.4 | 30.4 |
| 650°+ | 43.5 | 12.6 |
| Coke | | 16.1 |
| Selectivity: 430°+ feed to C$_5$–430° gasoline | | 38 |

Substantial conversions were effected to 430°- and 650°-products with this high sulfur and nitrogen-containing feed. The nitrogen content of the recovered liquid product was reduced to 1.4%. The selectivity of the conversion to C$_5$–430° gasoline was substantial at 38 wt. percent.

The nature of the present invention having been thus fully set forth and specific examples of the same given, what is claimed as new, useful, and unobvious and desired to be secured by Letters Patent is:

1. A composite cracking catalyst consisting essentially of from about 1 to about 20 weight percent of aluminum nitride or boron nitride dispersed on alumina or from about 1 to about 20 weight percent of aluminum nitride, boron nitride or silicon nitride dispersed on silica-alumina.

2. A method of cracking a petroleum feedstock which comprises contacting said feedstock with a catalyst consisting essentially of aluminum nitride, boron nitride or silicon nitride under cracking conditions of temperature and pressure.

3. The method of claim 2 wherein said feedstock and catalyst are contacted at a pressure between about atmospheric and 100 p.s.i.g.

4. The method of claim 3 wherein said catalyst is 1 to 20 percent by weight of aluminum nitride, boron nitride, boron nitride and/or silicon nitride dispersed on Al$_2$O$_3$ or SiO$_2$—Al$_2$O$_3$.

5. The method of claim 4 wherein said feedstock is a gas oil.

6. The method of claim 5 wherein said catalyst is 1 to 20 weight percent of BN dispersed on SiO$_2$—Al$_2$O$_3$.

7. The method of claim 2 in which the catalyst is 100% BN.

8. The method of claim 2 in which the catalyst is 1 to 20% by weight of BN dispersed on Al$_2$O$_3$.

9. The method of claim 2 in which the catalyst is 1 to 20 weight percent of BN dispersed on SiO$_2$—Al$_2$O$_3$.

10. The method of claim 2 in which the catalyst is 100% AlN.

11. The method of claim 2 in which the catalyst is 1 to 20% by weight of AlN dispersed on Al$_2$O$_3$.

12. The method of claim 2 in which the catalyst is 1 to 20% by weight of AlN dispersed on SiO$_2$—Al$_2$O$_3$.

13. The method of claim 2 in which the catalyst is 100% Si$_3$N$_4$.

14. The method of claim 2 in which the catalyst is 1 to 20% by weight of Si$_3$N$_4$ dispersed on Al$_2$O$_3$.

15. The method of claim 2 in which the catalyst is Si$_3$N$_4$ dispersed on SiO$_2$—Al$_2$O$_3$.

References Cited
UNITED STATES PATENTS

| 1,890,434 | 12/1932 | Krauch et al. | 208—10 |
| 1,931,550 | 10/1933 | Krauch et al. | 208—10 |
| 3,117,096 | 1/1964 | Harris et al. | 252—432 |
| 3,117,169 | 1/1964 | Coley et al. | 260—680 |

DELBERT E. GANTZ, Primary Examiner

G. E. SCHMITKONS, Assistant Examiner

U.S. Cl. X.R.

252—432, 438